(12) United States Patent
Zheng et al.

(10) Patent No.: US 11,828,902 B1
(45) Date of Patent: Nov. 28, 2023

(54) MULTI-SCALE THREE-DIMENSIONAL (3D) ENGINEERING GEOLOGICAL MODEL CONSTRUCTION SYSTEM AND METHOD

(71) Applicant: INSTITUTE OF GEOLOGY AND GEOPHYSICS, CAS, Beijing (CN)

(72) Inventors: Bowen Zheng, Beijing (CN); Shengwen Qi, Beijing (CN); Zhendong Cui, Beijing (CN); Rixiang Zhu, Beijing (CN); Bo Wan, Beijing (CN); Wang Zhang, Beijing (CN); Yongchao Li, Beijing (CN); Songfeng Guo, Beijing (CN); Tianming Huang, Beijing (CN); Haijun Zhao, Beijing (CN); Zan Wang, Beijing (CN); Yan Zhang, Beijing (CN); Yanlong Kong, Beijing (CN); Lina Ma, Beijing (CN); Xiaokun Hou, Beijing (CN); Wei Lu, Beijing (CN); Lei Fu, Beijing (CN); Pingchuan Dong, Beijing (CN)

(73) Assignee: INSTITUTE OF GEOLOGY AND GEOPHYSICS, CAS, Beijing (CN)

( * ) Notice: Subject to any disclaimer, the term of this patent is extended or adjusted under 35 U.S.C. 154(b) by 0 days.

(21) Appl. No.: 18/174,953

(22) Filed: Feb. 27, 2023

(30) Foreign Application Priority Data

Aug. 5, 2022 (CN) .......................... 202210934929.6

(51) Int. Cl.
*G01V 99/00* (2009.01)
*G01V 1/50* (2006.01)
(52) U.S. Cl.
CPC .............. *G01V 99/005* (2013.01); *G01V 1/50* (2013.01)

(58) Field of Classification Search
CPC ............................... G01V 99/005; G01V 1/50
(Continued)

(56) References Cited

FOREIGN PATENT DOCUMENTS

CN 107515423 A * 12/2017 ............. G01V 1/306
CN 107515423 A 12/2017
(Continued)

OTHER PUBLICATIONS

Office Action dated Sep. 14, 2022, issued in Chinese Application No. 202210934929.6.
(Continued)

*Primary Examiner* — John E Johansen
(74) *Attorney, Agent, or Firm* — DLA Piper LLP (US)

(57) ABSTRACT

The present disclosure provides a multi-scale three-dimensional (3D) engineering geological model construction system and method. A regional geological model of a target region, a site geological model of each engineering site, and a drilling geological model of each drilling well are constructed. The geological model of each drilling well is superimposed to the site geological model of the corresponding engineering site in the way of step-by-step superimposition, and the site geological model of each engineering site fused with the drilling geological model is superimposed to the regional geological model of the target region. Thus, multi-scale geological model fusion of drilling well, engineering site, and regional mountain is realized. The final multi-scale 3D engineering geological fusion model can provide multi-scale refined geological information for geological suitability evaluation of major geological engineering, so as to ensure accuracy of geological suitability evaluation and site selection of major geological engineering.

6 Claims, 3 Drawing Sheets

(58) Field of Classification Search
USPC .......................................................... 703/10
See application file for complete search history.

(56) References Cited

FOREIGN PATENT DOCUMENTS

| | | | | |
|---|---|---|---|---|
| CN | 109872389 | A | * | 6/2019 |
| CN | 109872389 | A | | 6/2019 |
| CN | 114820969 | A | * | 7/2022 |
| CN | 114880844 | A | * | 8/2022 |

OTHER PUBLICATIONS

Decision to Grant dated Oct. 14, 2022, issued in Chinese Application No. 202210934929.6.

* cited by examiner

MULTI-SCALE THREE-DIMENSIONAL (3D) ENGINEERING GEOLOGICAL MODEL CONSTRUCTION SYSTEM AND METHOD

CROSS REFERENCE TO RELATED APPLICATION

This patent application claims the benefit and priority of Chinese Patent Application No. 202210934929.6, filed with the China National Intellectual Property Administration on Aug. 5, 2022, the disclosure of which is incorporated by reference herein in its entirety as part of the present application.

TECHNICAL FIELD

The present disclosure relates to the technical field of rock engineering geomechanics, and in particular, to a multi-scale three-dimensional (3D) engineering geological model construction system and method.

BACKGROUND

In the field of rock engineering geomechanics, 3D engineering geological modeling and visualization technology, as a very important technical means, plays an increasingly important role in the process of engineering geological safety evaluation. However, most of the existing models are 3D geological framework models, which are difficult to perform multi-scale accurate characterization of the core heterogeneity and fracture and fracture system in strata or rock masses. In other words, the established 3D geological framework model is not refined and transparent enough, and small scale geological information is often generalized or ignored. Therefore, multi-scale refined geological information cannot be provided, which seriously restricts the accuracy of geological suitability evaluation and site selection of major geological engineering.

SUMMARY

An objective of the present disclosure is to provide a multi-scale 3D engineering geological model construction system and method, which provides multi-scale refined geological information for geological suitability evaluation of major geological engineering.

To achieve the above objective, the present disclosure provides the following technical solutions:

The present disclosure provides a multi-scale 3D engineering geological model construction system configured to construct a multi-scale 3D engineering geological fusion model of a target region. The target region includes multiple engineering sites. Each of the engineering sites includes multiple drilling wells.

The multi-scale 3D engineering geological model construction system includes:

a regional geological model construction module configured to construct a regional geological model of the target region according to a multi-resolution remote sensing image and a digital elevation model (DEM) of the target region, where the regional geological model is a 3D engineering geological model at a regional mountain scale;

a site geological model construction module configured to construct a site geological model of the engineering site in the target region according to topographic information and stratigraphic lithologic information of the engineering site, where the site geological model is a 3D engineering geological model at an engineering site scale;

a drilling geological model construction module configured to construct a drilling geological model of the drilling well in the target region according to parameters of a core sample and a cuttings sample taken from the drilling well, where the drilling geological model is a 3D engineering geological model at a drilling scale;

a drilling-site model fusion module configured to superimpose drilling geological models spatially located in a same engineering site to the site geological model of the engineering site to obtain a drilling-site geological fusion model of the engineering site; and a site-region model fusion module configured to superimpose the drilling-site geological fusion models of the engineering sites to the regional geological model of the target region to obtain the multi-scale 3D engineering geological fusion model of the target region.

Optionally, the multi-scale 3D engineering geological model construction system further includes:

a drilling geological data prediction module configured to predict parameters of the drilling geological model of the drilling well using a well trained drilling geological data prediction model according to the parameters of the core sample and the cuttings sample taken from the drilling well; and an engineering site geological data prediction module configured to predict parameters of the site geological model of the engineering site using a well trained engineering site geological data prediction model according to the topographic information and the stratigraphic lithologic information of the engineering site.

Optionally, the multi-scale 3D engineering geological model construction system further includes:

a prediction model establishment module configured to establish a drilling geological data prediction model for predicting the parameters of the drilling geological model and an engineering site geological data prediction model for predicting the parameters of the site geological model based on a neural network algorithm;

a drilling geological training set establishment module configured to establish a drilling geological training set for training the drilling geological data prediction model, where the drilling geological training set includes parameters of respective core samples and cuttings samples of the multiple drilling wells and parameters of drilling geological models corresponding to the drilling wells;

a drilling geological data prediction model training module configured to train the drilling geological data prediction model using the drilling geological training set by taking the parameters of the core sample and the cuttings sample of the drilling well as an input and the parameters of the drilling geological model corresponding to the drilling well as a target output to obtain the well trained drilling geological data prediction model;

an engineering site geological training set establishment module configured to establish an engineering site geological training set for training the engineering site geological data prediction model, where the engineering site geological training set includes respective topographic information and stratigraphic lithologic information of the multiple engineering sites and parameters of site geological models corresponding to the engineering sites; and an engineering site geological data prediction model training module configured to train the engineering site geological data prediction model using the engineering site geological training set by taking the topographic information and the stratigraphic lithologic information of the engineering site as an input and the parameters of the site geological model corresponding to the engineering site as a target output to obtain the well trained engineering site geological data prediction model.

Optionally, the neural network algorithm is a residual neural network (ResNet) algorithm.

Corresponding to the aforementioned multi-scale 3D engineering geological model construction system, the present disclosure further provides a multi-scale 3D engineering geological model construction method configured to construct a multi-scale 3D engineering geological fusion model of a target region. The target region includes multiple engineering sites. Each of the engineering sites includes multiple drilling wells.

The multi-scale 3D engineering geological model construction method includes:

obtaining a multi-resolution remote sensing image and a DEM of the target region;

constructing a regional geological model of the target region according to the multi-resolution remote sensing image and the DEM of the target region, where the regional geological model is a 3D engineering geological model at a regional mountain scale;

constructing a site geological model for the engineering site in the target region according to topographic information and stratigraphic lithologic information of the engineering site, where the site geological model is a 3D engineering geological model at an engineering site scale;

constructing a drilling geological model for the drilling well in the target region according to parameters of a core sample and a cuttings sample taken from the drilling well, where the drilling geological model is a 3D engineering geological model at a drilling scale;

superimposing drilling geological models spatially located in a same engineering site to the site geological model of the engineering site to obtain a drilling-site geological fusion model of the engineering site; and superimposing the drilling-site geological fusion models of the engineering sites to the regional geological model of the target region to obtain the multi-scale 3D engineering geological fusion model of the target region.

Optionally, the multi-scale 3D engineering geological model construction method further includes the following steps before the step of superimposing drilling geological models spatially located in a same engineering site to the site geological model of the engineering site to obtain a drilling-site geological fusion model of the engineering site:

predicting parameters of the drilling geological model of the drilling well using a well trained drilling geological data prediction model according to the parameters of the core sample and the cuttings sample taken from the drilling well; and predicting parameters of the site geological model of the engineering site using a well trained engineering site geological data prediction model according to the topographic information and the stratigraphic lithologic information of the engineering site.

Optionally, the multi-scale 3D engineering geological model construction method further includes the following steps before the step of predicting parameters of the drilling geological model of the drilling well using a well trained drilling geological data prediction model according to the parameters of the core sample and the cuttings sample taken from the drilling well:

establishing a drilling geological data prediction model for predicting the parameters of the drilling geological model based on a neural network algorithm;

establishing a drilling geological training set for training the drilling geological data prediction model, where the drilling geological training set includes parameters of respective core samples and cuttings samples of the multiple drilling wells and parameters of drilling geological models corresponding to the drilling wells; and training the drilling geological data prediction model using the drilling geological training set by taking the parameters of the core sample and the cuttings sample of the drilling well as an input and the parameters of the drilling geological model corresponding to the drilling well as a target output to obtain the well trained drilling geological data prediction model.

Optionally, the multi-scale 3D engineering geological model construction method further includes the following steps before the step of predicting parameters of the site geological model of the engineering site using a well trained engineering site geological data prediction model according to the topographic information and the stratigraphic lithologic information of the engineering site:

establishing an engineering site geological data prediction model for predicting the parameters of the site geological model based on a neural network algorithm;

establishing an engineering site geological training set for training the engineering site geological data prediction model, where the engineering site geological training set includes respective topographic information and stratigraphic lithologic information of the multiple engineering sites and parameters of site geological models corresponding to the engineering sites; and training the engineering site geological data prediction model using the engineering site geological training set by taking the topographic information and the stratigraphic lithologic information of the engineering site as an input and the parameters of the site geological model corresponding to the engineering site as a target output to obtain the well trained engineering site geological data prediction model.

Optionally, the neural network algorithm is a ResNet.

According to the specific embodiments provided by the present disclosure, the present disclosure discloses the following technical effects:

The present disclosure provides the multi-scale 3D engineering geological model construction system and method. The construction system includes: a regional geological model construction module configured to construct a regional geological model of the target region according to a multi-resolution remote sensing image and a DEM of the target region; a site geological model construction module configured to construct a site geological model of the engineering site in the target region according to topographic information and stratigraphic lithologic information of the engineering site; a drilling geological model construction module configured to construct a drilling geological model of the drilling well in the target region according to parameters of a core sample and a cuttings sample taken from the drilling well; a drilling-site model fusion module configured to superimpose drilling geological models spatially located in a same engineering site to the site geological model of the engineering site to obtain a drilling-site geological fusion model of the engineering site; and a site-region model fusion module configured to superimpose the drilling-site geological fusion models of the engineering sites to the regional geological model of the target region to obtain the multi-scale 3D engineering geological fusion model of the target region. According to the multi-scale 3D engineering geological model construction system and method provided by the present disclosure, a regional geological model of a target region, a site geological model of each engineering site, and a drilling geological model of each drilling well are constructed. The geological model of each drilling well is superimposed to the site geological model of the corresponding engineering site in the way of step-by-step superimposition, and the site geological model of each engineering site fused with the drilling geological model is superimposed to the regional geological model of the target region. Thus, multi-scale geological model fusion of drilling well, engineering site, and regional mountain is realized. The final multi-scale 3D engineering geological fusion model can provide multi-scale refined geological information for geological suitability evaluation of major geological engineering, so as to ensure accuracy of geological suitability evaluation and site selection of major geological engineering.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a multi-scale 3D engineering geological model construction system and method, which provides multi-scale refined geological information for geological suitability evaluation of major geological engineering.

To make the above-mentioned objective, features, and advantages of the present disclosure clearer and more comprehensible, the present disclosure will be further described in detail below in conjunction with the accompanying drawings and specific embodiments.

Embodiment 1

Figure 1:
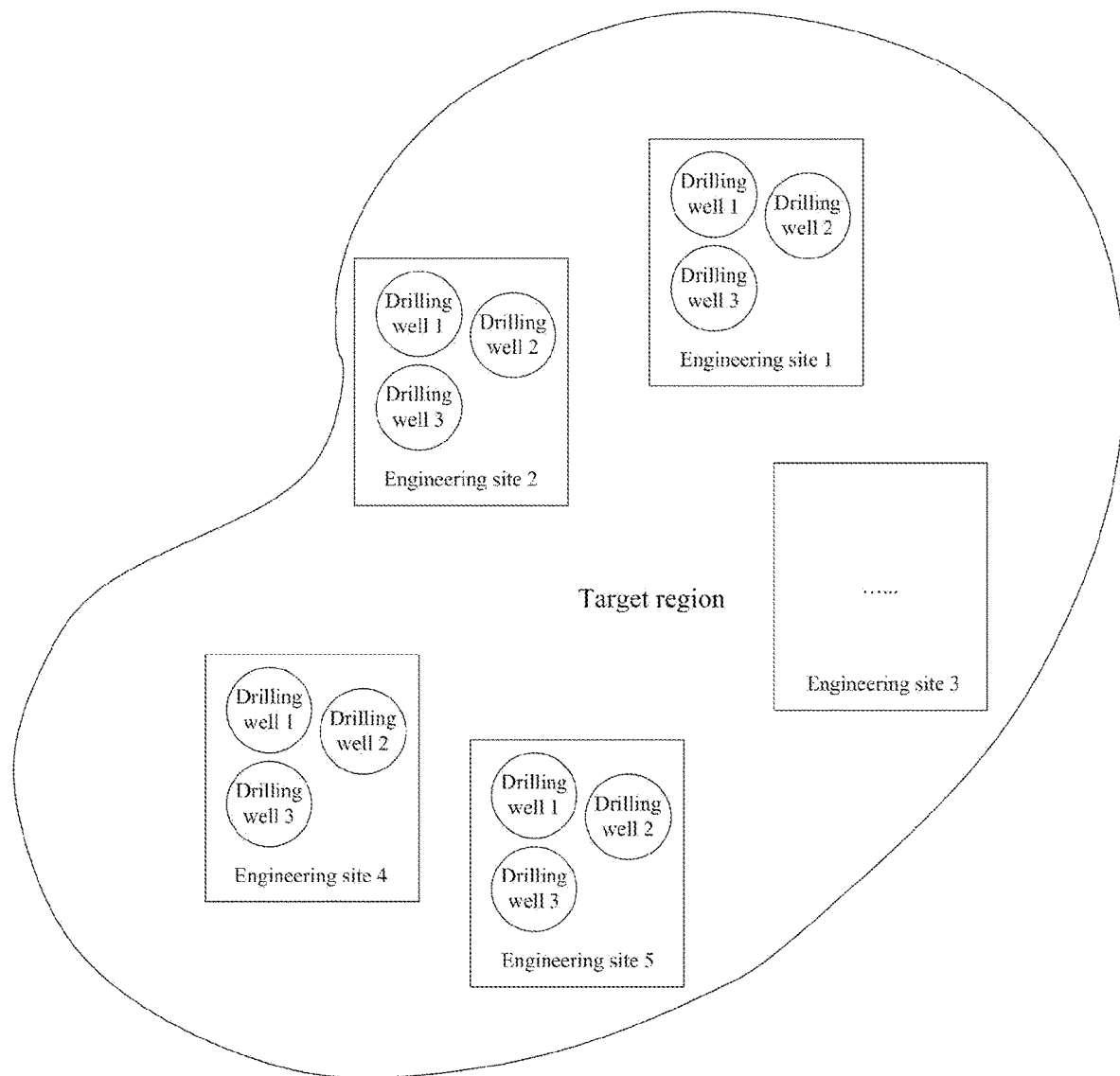
FIG. 1 is a schematic diagram of a target region in Embodiment 1 of the present disclosure.

The present embodiment provides a multi-scale 3D engineering geological model construction system configured to construct a multi-scale 3D engineering geological fusion model of a target region. As shown in FIG. 1, the target region includes multiple engineering sites. Each of the engineering sites includes multiple drilling wells.

Figure 2:
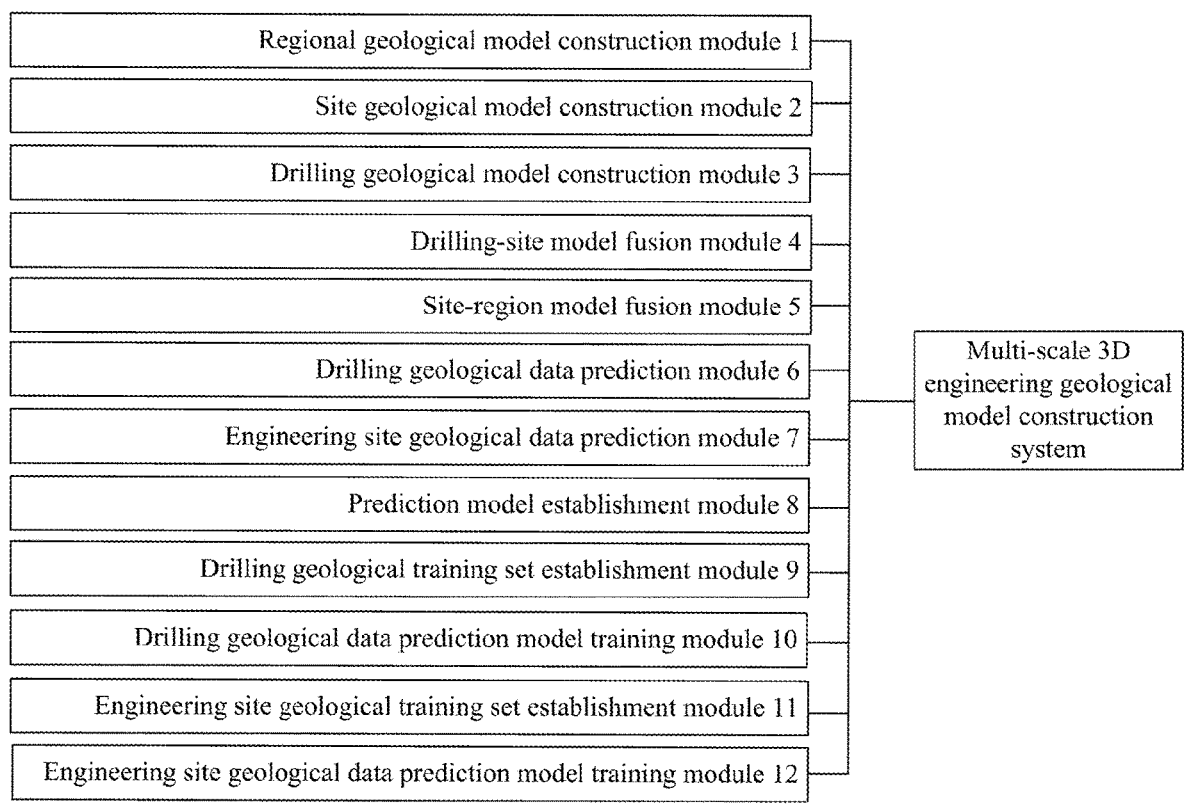
FIG. 2 is a schematic structural diagram of a multi-scale 3D engineering geological model construction system provided by Embodiment 1 of the present disclosure.

As shown in a schematic structural diagram of FIG. 2, the multi-scale 3D engineering geological model construction system includes: a regional geological model construction module 1, a site geological model construction module 2, a drilling geological model construction module 3, a drilling-site model fusion module 4, and a site-region model fusion module 5.

The regional geological model construction module 1 is configured to construct a regional geological model of the target region according to a multi-resolution remote sensing image and a DEM of the target region. The regional geological model is a 3D engineering geological model at a regional mountain scale.

The site geological model construction module 2 is configured to construct a site geological model of the engineering site in the target region according to topographic information and stratigraphic lithologic information of the engineering site. The site geological model is a 3D engineering geological model at an engineering site scale.

The drilling geological model construction module 3 is configured to construct a drilling geological model of the drilling well in the target region according to parameters of a core sample and a cuttings sample taken from the drilling well. The drilling geological model is a 3D engineering geological model at a drilling scale.

The drilling-site model fusion module 4 is configured to superimpose drilling geological models spatially located in a same engineering site to the site geological model of the engineering site to obtain a drilling-site geological fusion model of the engineering site.

The site-region model fusion module 5 is configured to superimpose the drilling-site geological fusion models of the engineering sites to the regional geological model of the target region to obtain the multi-scale 3D engineering geological fusion model of the target region.

In order to reduce the workload, in the present embodiment, the multi-scale 3D engineering geological model construction system further includes: a drilling geological data prediction module 6 and an engineering site geological data prediction module 7.

The drilling geological data prediction module 6 is configured to predict parameters of the drilling geological model of the drilling well using a well trained drilling geological data prediction model according to the parameters of the core sample and the cuttings sample taken from the drilling well.

The engineering site geological data prediction module 7 is configured to predict parameters of the site geological model of the engineering site using a well trained engineering site geological data prediction model according to the topographic information and the stratigraphic lithologic information of the engineering site.

In order to ensure the accuracy of the drilling geological data prediction model and the engineering site geological data prediction model, the multi-scale 3D engineering geological model construction system further includes: a prediction model establishment module 8, a drilling geological training set establishment module 9, a drilling geological data prediction model training module 10, an engineering site geological training set establishment module 11, and an engineering site geological data prediction model training module 12.

The prediction model establishment module 8 is configured to establish a drilling geological data prediction model for predicting the parameters of the drilling geological model and an engineering site geological data prediction model for predicting the parameters of the site geological model based on a neural network algorithm.

The drilling geological training set establishment module 9 is configured to establish a drilling geological training set for training the drilling geological data prediction model. The drilling geological training set includes parameters of respective core samples and cuttings samples of the multiple drilling wells and parameters of drilling geological models corresponding to the drilling wells.

The drilling geological data prediction model training module 10 is configured to train the drilling geological data prediction model using the drilling geological training set by taking the parameters of the core sample and the cuttings sample of the drilling well as an input and the parameters of the drilling geological model corresponding to the drilling well as a target output to obtain the well trained drilling geological data prediction model.

The engineering site geological training set establishment module 11 is configured to establish an engineering site geological training set for training the engineering site geological data prediction model. The engineering site geological training set includes respective topographic information and stratigraphic lithologic information of the multiple engineering sites and parameters of site geological models corresponding to the engineering sites.

The engineering site geological data prediction model training module 12 is configured to train the engineering site geological data prediction model using the engineering site geological training set by taking the topographic information and the stratigraphic lithologic information of the engineering site as an input and the parameters of the site geological model corresponding to the engineering site as a target output to obtain the well trained engineering site geological data prediction model.

In the present embodiment, the neural network algorithm is a ResNet algorithm.

Embodiment 2

Figure 3:
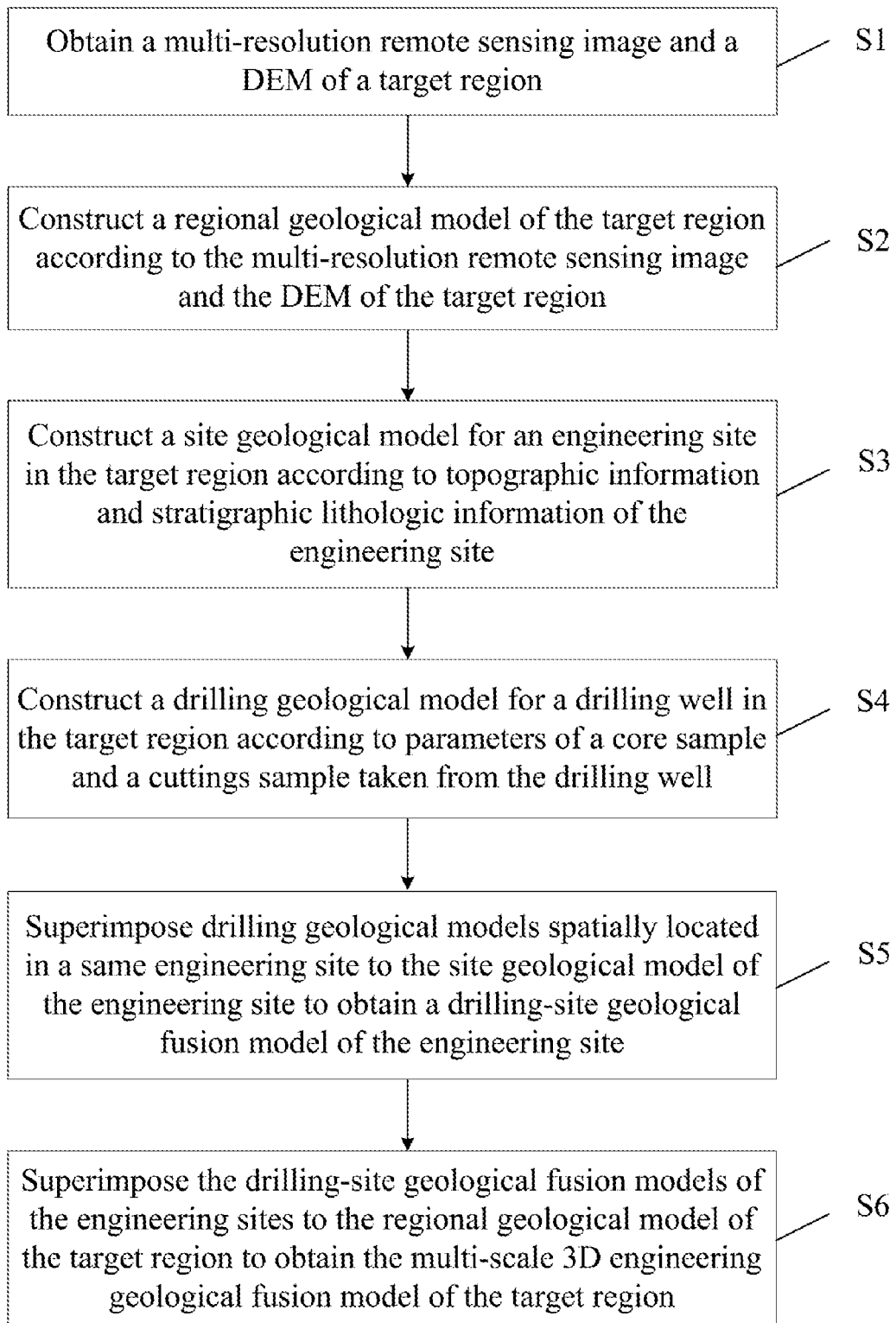
FIG. 3 is a flow chart of a multi-scale 3D engineering geological model construction method provided by Embodiment 2 of the present disclosure.

As shown in a flow chart of FIG. 3, corresponding to the multi-scale 3D engineering geological model construction system provided by Embodiment 1, the present embodiment provides a multi-scale 3D engineering geological model construction method configured to construct a multi-scale 3D engineering geological fusion model of a target region. The target region includes multiple engineering sites. Each of the engineering sites includes multiple drilling wells.

The multi-scale 3D engineering geological model construction method includes the following steps.

S1, A multi-resolution remote sensing image and a DEM of the target region are obtained.

S2, A regional geological model of the target region is constructed according to the multi-resolution remote sensing image and the DEM of the target region. The regional geological model is a 3D engineering geological model at a regional mountain scale.

S3, A site geological model is constructed for the engineering site in the target region according to topographic information and stratigraphic lithologic information of the engineering site. The site geological model is a 3D engineering geological model at an engineering site scale.

S4, A drilling geological model is constructed for the drilling well in the target region according to parameters of a core sample and a cuttings sample taken from the drilling well. The drilling geological model is a 3D engineering geological model at a drilling scale.

S5, Drilling geological models spatially located in a same engineering site are superimposed to the site geological model of the engineering site to obtain a drilling-site geological fusion model of the engineering site.

S6, The drilling-site geological fusion models of the engineering sites are superimposed to the regional geological model of the target region to obtain the multi-scale 3D engineering geological fusion model of the target region.

In order to reduce the workload, in the present embodiment, the multi-scale 3D engineering geological model construction method further includes the following steps before step S5 of superimposing drilling geological models spatially located in a same engineering site to the site geological model of the engineering site to obtain a drilling-site geological fusion model of the engineering site.

Parameters of the drilling geological model of the drilling well are predicted using a well trained drilling geological data prediction model according to the parameters of the core sample and the cuttings sample taken from the drilling well.

Parameters of the site geological model of the engineering site are predicted using a well trained engineering site geological data prediction model according to the topographic information and the stratigraphic lithologic information of the engineering site.

In order to ensure the accuracy of the drilling geological data prediction model, the multi-scale 3D engineering geological model construction method further includes the following steps before the step of predicting parameters of the drilling geological model of the drilling well using a well trained drilling geological data prediction model according to the parameters of the core sample and the cuttings sample taken from the drilling well.

A drilling geological data prediction model for predicting the parameters of the drilling geological model is established based on a neural network algorithm.

A drilling geological training set for training the drilling geological data prediction model is established. The drilling geological training set includes parameters of respective core samples and cuttings samples of the multiple drilling wells and parameters of drilling geological models corresponding to the drilling wells.

The drilling geological data prediction model is trained using the drilling geological training set by taking the parameters of the core sample and the cuttings sample of the drilling well as an input and the parameters of the drilling geological model corresponding to the drilling well as a target output to obtain the well trained drilling geological data prediction model.

In order to ensure the accuracy of the engineering site geological data prediction model, the multi-scale 3D engineering geological model construction method further includes the following steps before the step of predicting parameters of the site geological model of the engineering site using a well trained engineering site geological data prediction model according to the topographic information and the stratigraphic lithologic information of the engineering site.

An engineering site geological data prediction model for predicting the parameters of the site geological model is established based on a neural network algorithm.

An engineering site geological training set for training the engineering site geological data prediction model is established. The engineering site geological training set includes respective topographic information and stratigraphic lithologic information of the multiple engineering sites and parameters of site geological models corresponding to the engineering sites.

The engineering site geological data prediction model is trained using the engineering site geological training set by taking the topographic information and the stratigraphic lithologic information of the engineering site as an input and the parameters of the site geological model corresponding to the engineering site as a target output to obtain the well trained engineering site geological data prediction model.

In the present embodiment, the neural network algorithm is a ResNet.

The multi-scale 3D engineering geological model construction method provided by the present disclosure is illustrated in combination with a specific example.

Step A, A regional geological model of a target region is constructed according to a multi-resolution remote sensing image and a DEM of the target region.

Step A1, Data of Space Shuttle Radar Topography Mission 3 (SRTM3) with a resolution of 90 m, Space Shuttle Radar Topography Mission 1 (SRTM1) with a resolution of 30 m, and Advanced Land Observing Satellite Digital Elevation Model (ALOSDEM) with a resolution of 12.5 m are collected.

Step A2, Various means such as special band synthesis, optical image enhancement, color fusion, and superimposition of 3D views are adopted to enhance the linear imprint left by the structural plane of the regional mountain scale cutting the surface displayed in the remote sensing image collected in step A1.

Step A3, Based on the data of step A1 and the linear imprint of step A2, the structural plane of the regional mountain scale is visually interpreted. Through field tracing investigation along the structural plane and fault geological geomorphology investigation, the interpretation results are checked, and spatial distribution characteristics of the level I-III structural planes of the regional mountain surface are obtained.

Step A4, Based on the small scale topographic map, namely the regional mountain topographic map, the elevation information of the regional mountain is extracted. The topographic data is converted into the DEM using the ArcGIS software, and the DEM file is imported into the RHINO software, so as to establish a 3D terrain model of the regional mountain.

Step A5, The small scale stratigraphic lithology map, namely, the regional mountain stratigraphic lithology map, is vectorized using the ArcGIS software. The spatial distribution characteristics of the stratigraphic lithology corresponding to the regional mountain are extracted and imported into the RHINO software. The regional mountain stratigraphic lithology map is superimposed to the 3D terrain model of the regional mountain established in step A4 to form a 3D geological model of the regional mountain.

Step A6, Spatial distribution characteristics of the level I-III structural planes of the regional mountain surface obtained in step A3 are vectorized through the ArcGIS software, imported into the RHINO software for spatial extension, and superimposed into the 3D geological model of the regional mountain to obtain a regional geological model. The regional geological model is a 3D engineering geological model at a regional mountain scale.

Step B, A site geological model is constructed for the engineering site in the target region according to topographic information and stratigraphic lithologic information of the engineering site.

Step B1, At the engineering site scale, a detailed outcrop survey is carried out. The key structural trace sections of the engineering site are measured. The level III-V structural planes, including bedding plane, fault plane, fold two-wing plane, axial plane cleavage, and conjugated joint, are identified and acquired by means of unmanned aerial vehicle (UAV) oblique photography, LiDAR, 3D laser scanning, line measurement (window measurement), adit, and trench cataloging.

Step B2, According to the data determined in step B1, the detailed statistical work of the level III-V structural planes is carried out to determine the type of structural plane, structural environment, distribution characteristics and formation periods of different structural planes, and fracture parameters of structural plane, which include: occurrence, trace length, opening, continuity, density, spacing, spatial intersection combination, strength, filling degree, and filling material.

Step B3, Refined structure information of multiple boreholes and geophysical exploration information between boreholes are obtained by combining drilling logging, logging, imaging, cross-hole seismic, and high-density electrical method.

Step B4, Based on the fracture parameters of the structural plane determined in step B2 and the refined structure information of multiple boreholes and the geophysical information between boreholes obtained in step B3, the dominant occurrence is divided based on the distribution characteristics of the level III-V structural planes using the probabilistic statistics theory. Furthermore, the occurrence and trace length of the structural plane is corrected using the Markov chain Monte Carlo (MCMC) random simulation method to simulate the diameter, spacing and density, so as to predict the spatial distribution information of the level III-V structural planes.

Step B5, Based on the large scale topographic map, namely the engineering site topographic map, the elevation information of the engineering site is extracted. The topographic data is converted into the DEM using the ArcGIS software, and the DEM file is imported into the RHINO software, so as to establish a 3D terrain model of the engineering site.

Step B6, The large scale stratigraphic lithology map, namely, the engineering site stratigraphic lithology map, is vectorized using the ArcGIS software. The spatial distribution characteristics of the stratigraphic lithology corresponding to the engineering site are extracted and imported into the RHINO software. The spatial distribution characteristics of the stratigraphic lithology of the engineering site are superimposed to the 3D terrain model of the engineering site established in step B5 to form a 3D geological model of the engineering site.

Step B7, Spatial distribution characteristics of the level structural planes of the engineering site surface obtained in step B4 are vectorized through the ArcGIS software, imported into the RHINO software for spatial extension, and superimposed into the 3D geological model of the engineering site to obtain a site geological model. The site geological model is a 3D engineering geological model at an engineering site scale.

Step C, A drilling geological model is constructed for the drilling well in the target region according to parameters of a core sample and a cuttings sample taken from the drilling well.

Step C1, At a drilling scale, core samples and cuttings samples from different boreholes and different key formations in the same engineering site are acquired. High resolution micro computed tomography (CT) and focused ion beam scanning electron microscope integrated double-beam system (FIB-SEM) are used to perform fine scanning and quantitative characterization of the micro-meso structure, such as nano-micron and millimeter-scale pores and fractures, and physical parameters of core samples. The 3D digital core reconstruction technology is used to establish the 3D digital core visualization model.

Step C2, The mineral composition and non-uniform distribution of the cuttings sample are tested, and the basic physical and mechanical parameters of the core are tested in the laboratory, including porosity, permeability, strength, elastic modulus, and Poisson's ratio. In the 3D digital core visualization model established in step C1, the quantitative and visual characterization of core heterogeneity, basic physical and mechanical parameters and non-uniform distribution of pore pressure is realized, and finally a 3D engineering geological model at a drilling scale is formed.

Step D, The prediction model is trained using the data of known drilling wells or engineering sites, and the geological model of unknown drilling wells or engineering sites is predicted using the prediction model. In addition, the cross-scale fusion of the geological models at the drilling scale, the engineering site scale, and the regional mountain scale is carried out.

Step D1, Based on the 3D digital core data (including the micro-meso structure, such as nano-micron and millimeter-scale pores and fractures, and physical parameters of core samples) obtained in step C1 and the parameters of the drilling geological model established in step C2, 80% of the 3D digital core data from different drilling wells in the same engineering site and the parameters of the corresponding drilling geological model are taken as a training set and 20% as a test set. The ResNet algorithm and big data analysis technology are adopted to carry out machine learning with the training set data, so as to establish a drilling geological data prediction model at the drilling scale. The prediction model is checked with the test set data.

Step D2, The parameters of other drilling geological models in the whole engineering site are predicted using the drilling geological data prediction model. Moreover, the drilling geological models with similar properties and spatial continuity are fused and spatially superimposed with the site geological model obtained in step B7 to form the engineering site geological fusion model containing drilling scale information, so as to realize the cross-scale fusion of the geological models at the drilling scale and the engineering site scale.

Step D3, Based on the topographic information and the stratigraphic lithologic information obtained in step B1 and the parameters of the site geological models established in step B7, 80% of the topographic information and the stratigraphic lithologic information of the engineering sites and the parameters of the corresponding site geological models are taken as a training set and 20% as a test set. The ResNet algorithm and big data analysis technology are adopted to carry out machine learning with the training set data, so as to establish an engineering site geological data prediction model at the engineering site scale. The prediction model is checked with the test set data.

Step D4, The parameters of the site geological models in the whole target region are predicted using the engineering site geological data prediction model. Moreover, the site geological models with similar properties and spatial continuity are fused and spatially superimposed with the regional geological model at the regional mountain scale obtained in step A6 to form the regional geological model containing drilling scale information and engineering site scale information, so as to realize the cross-scale fusion of the geological models at the drilling scale, the engineering site scale, and the regional mountain scale.

In step A, step B and step C, the 3D engineering geological models at a single scale, namely the regional mountain scale, the engineering site scale, and the drilling scale, are established. In step D2, the 3D engineering geological fusion model across two scales, namely the drilling scale and the engineering site scale, is established. In step D4, the 3D engineering geological fusion model across three scales, namely the drilling scale, the engineering site scale, and the regional mountain scale, is established. Based on these models, the multi-view real-time dynamic cutting technology can be used to achieve the arbitrary angle section cutting, isoline embedding, isosurface and isovolume tracking and extraction of single scale or cross-scale geological fusion model based on the visualization methods such as computer graphics surface rendering and direct volume rendering.

Based on the virtual reality geography information system (VRGIS) technology combining geographic information system and virtual reality, transparent characterization, real-time interactive query, analysis and output of the single scale and cross-scale geological fusion model can be realized. Moreover, the non-uniform distribution characteristics of basic physical and mechanical parameters (porosity, permeability, strength, elastic modulus, Poisson's ratio, pore pressure, etc.) of 3D engineering geological bodies at different scales can be quantitatively analyzed, providing multi-scale refined geological information for quantitative evaluation of geological suitability of major geological engineering.

Specific examples are used herein, but the above description is only a description of the principle and embodiment of the present disclosure, and the above embodiment is only used to help understand the method of the present disclosure and its core ideas. Those skilled in the art should understand that the above modules or steps of the present disclosure can be implemented by means of a general-purpose computer device, or optionally, by means of a program code executable by a computing device, such that they can be stored in a storage device and executed by a computing device, or they can be made separately into integrated circuit modules, or a number of modules or steps in them are made into a single integrated circuit module for implementation. The present disclosure is not limited to any specific hardware and software combination.

In addition, those of ordinary skill in the art can make various modifications in terms of specific implementations and the scope of application according to the ideas of the present disclosure. In conclusion, the content of the present specification shall not be construed as limitations to the present disclosure.

What is claimed is:

1. A multi-scale three-dimensional (3D) engineering geological model construction system comprising at least one processor, wherein the multi-scale 3D engineering geological model construction system is configured to construct a multi-scale 3D engineering geological fusion model of a target region, the target region comprises multiple engineering sites, and each of the engineering sites comprises multiple drilling wells; and the multi-scale 3D engineering geological model construction system comprises:
a regional geological model construction module implemented by the at least one processor and configured to construct a regional geological model of the target region according to a multi-resolution remote sensing image and a digital elevation model (DEM) of the target region, wherein the regional geological model is a 3D engineering geological model at a regional mountain scale;

a site geological model construction module implemented by the at least one processor and configured to construct a site geological model of the engineering site in the target region according to topographic information and stratigraphic lithologic information of the engineering site, wherein the site geological model is a 3D engineering geological model at an engineering site scale;

a drilling geological model construction module implemented by the at least one processor and configured to construct a drilling geological model of the drilling well in the target region according to parameters of a core sample and a cuttings sample taken from the drilling well, wherein the drilling geological model is a 3D engineering geological model at a drilling scale;

a drilling-site model fusion module implemented by the at least one processor and configured to superimpose drilling geological models spatially located in a same engineering site to the site geological model of the engineering site to obtain a drilling-site geological fusion model of the engineering site; and a site-region model fusion module implemented by the at least one processor and configured to superimpose the drilling-site geological fusion models of the engineering sites to the regional geological model of the target region to obtain the multi-scale 3D engineering geological fusion model of the target region;

a prediction model establishment module implemented by the at least one processor and configured to establish a drilling geological data prediction model for predicting parameters of the drilling geological model and an engineering site geological data prediction model for predicting parameters of the site geological model based on a neural network algorithm;

a drilling geological training set establishment implemented by the at least one processor and module configured to establish a drilling geological training set for training the drilling geological data prediction model, wherein the drilling geological training set comprises parameters of respective core samples and cuttings samples of the multiple drilling wells and parameters of drilling geological models corresponding to the drilling wells;

a drilling geological data prediction model training module implemented by the at least one processor and configured to train the drilling geological data prediction model using the drilling geological training set by taking the parameters of the core sample and the cuttings sample of the drilling well as an input and the parameters of the drilling geological model corresponding to the drilling well as a target output to obtain a well trained drilling geological data prediction model;

an engineering site geological training set establishment module implemented by the at least one processor and configured to establish an engineering site geological training set for training the engineering site geological data prediction model, wherein the engineering site geological training set comprises respective topographic information and stratigraphic lithologic information of the multiple engineering sites and parameters of site geological models corresponding to the engineering sites; and an engineering site geological data prediction model training module implemented by the at least one processor and configured to train the engineering site geological data prediction model using the engineering site geological training set by taking the topographic information and the stratigraphic lithologic information of the engineering site as an input and the parameters of the site geological model corresponding to the engineering site as a target output to obtain a well trained engineering site geological data prediction model.

2. The multi-scale 3D engineering geological model construction system according to claim 1, further comprising:

a drilling geological data prediction module implemented by the at least one processor and configured to predict parameters of the drilling geological model of the drilling well using the well trained drilling geological data prediction model according to the parameters of the core sample and the cuttings sample taken from the drilling well; and an engineering site geological data prediction module implemented by the at least one processor and configured to predict the parameters of the site geological model of the engineering site using the well trained engineering site geological data prediction model according to the topographic information and the stratigraphic lithologic information of the engineering site.

3. The multi-scale 3D engineering geological model construction system according to claim 1, wherein the neural network algorithm is a residual neural network (ResNet) algorithm.

4. A multi-scale 3D engineering geological model construction method, wherein the multi-scale 3D engineering geological model construction method is used to construct a multi-scale 3D engineering geological fusion model of a target region, the target region comprises multiple engineering sites, and each of the engineering sites comprises multiple drilling wells; and the multi-scale 3D engineering geological model construction method comprises:

obtaining a multi-resolution remote sensing image and a DEM of the target region;

constructing a regional geological model of the target region according to the multi-resolution remote sensing image and the DEM of the target region, wherein the regional geological model is a 3D engineering geological model at a regional mountain scale;

establishing an engineering site geological data prediction model for predicting parameters of the site geological model based on a neural network algorithm;

establishing an engineering site geological training set for training the engineering site geological data prediction model, wherein the engineering site geological training set comprises respective topographic information and stratigraphic lithologic information of the multiple engineering sites and parameters of site geological models corresponding to the engineering sites;

training the engineering site geological data prediction model using the engineering site geological training set by taking the topographic information and the stratigraphic lithologic information of the engineering site as an input and the parameters of the site geological model corresponding to the engineering site as a target output to obtain a well trained engineering site geological data prediction model;

constructing a site geological model for the engineering site in the target region according to topographic information and stratigraphic lithologic information of the engineering site, wherein the site geological model is a 3D engineering geological model at an engineering site scale;

drilling geological model based on a neural network algorithm;

establishing a drilling geological training set for training the drilling geological data prediction model, wherein the drilling geological training set comprises parameters of respective core samples and cuttings samples of the multiple drilling wells and parameters of drilling geological models corresponding to the drilling wells;

training the drilling geological data prediction model using the drilling geological training set by taking the parameters of the core sample and the cuttings sample of the drilling well as an input and the parameters of the drilling geological model corresponding to the drilling well as a target output to obtain a well trained drilling geological data prediction model;

constructing a drilling geological model for the drilling well in the target region according to parameters of a core sample and a cuttings sample taken from the drilling well, wherein the drilling geological model is a 3D engineering geological model at a drilling scale;

superimposing drilling geological models spatially located in a same engineering site to the site geological model of the engineering site to obtain a drilling-site geological fusion model of the engineering site; and superimposing the drilling-site geological fusion models of the engineering sites to the regional geological model of the target region to obtain the multi-scale 3D engineering geological fusion model of the target region.

5. The multi-scale 3D engineering geological model construction method according to claim 4, further comprising the following steps before the step of superimposing drilling geological models spatially located in a same engineering site to the site geological model of the engineering site to obtain a drilling-site geological fusion model of the engineering site:

predicting parameters of the drilling geological model of the drilling well using a well trained drilling geological data prediction model according to the parameters of the core sample and the cuttings sample taken from the drilling well; and predicting parameters of the site geological model of the engineering site using a well trained engineering site geological data prediction model according to the topographic information and the stratigraphic lithologic information of the engineering site.

6. The multi-scale 3D engineering geological model construction method according to claim 4, wherein the neural network algorithm is a ResNet.

* * * * *